Patented Jan. 25, 1927.

1,615,816

UNITED STATES PATENT OFFICE.

CHARLES DICKENS, OF OAKLAND, CALIFORNIA.

PIGMENT AND PROCESS OF MAKING THE SAME.

No Drawing.    Application filed February 4, 1924. Serial No. 690,334.

The invention relates to pigment and the method of making the same and particularly to a pigment having a barium base.

An object of the invention is to provide a relatively inexpensive barium base pigment.

Another object of the invention is to provide yellow and red pigments in which the colors are fixed and unaffected by sunlight.

Another object of the invention is to provide a process of making pigment of barium base.

The invention possesses other advantageous features, some of which, with the foregoing, will be set forth at length in the following description, where I shall outline in full one method of carrying out the process of my invention to produce pigment.

The pigment of my invention is a barium base pigment and is the result of a reaction, in aqueous solution, of barium sulphide and a salt of uranium, excellent results having been obtained with uranium acetate.

I have found that by varying the percentages of barium sulphide to uranium salt in the solution, that different colors are produced. When the amount of barium sulphide is approximately .01 per cent of the amount of uranium salt, the proportions being taken by weight of the dry ingredients, a yellow pigment is obtained and as the percentage of barium sulphide is increased, the shade of yellow becomes darker, and when the barium sulphide is equivalent to one per cent of the uranium salt, a dark yellow pigment is produced. As the percentage of barium sulphide is further increased, an orange pigment is produced and when the percentage of barium sulphide reaches ten per cent a light red pigment results. Further increasing the percentage of barium sulphide results in the production of a darker red pigment and further increases will produce a brown pigment. When the amount of barium sulphide used is equivalent to ninety per cent, the precipitate is black. The barium sulphide and the uranium salts are preferably brought together in saturated solution but the uranium salt may be added to the barium sulphide solution in solid form, so that the two salts are brought into contact in aqueous solution. The mixture is placed in shallow pans or other vessels and allowed to stand until all or most of the liberated sulphuretted hydrogen gas is released. The reaction may be hastened by heating the mixture to raise its temperature.

I have found that the beneficial results of the invention may be increased by the presence in the solution, preferably at the time of the reaction, of a finely divided insoluble material for which the pigment has a physical affinity. The pigment is adsorbed on the finely divided material. By the use of the finely divided material, a much greater amount of pigment is produced, thus reducing the cost of producing a unit weight of pigment. I have found that finely divided barium sulphate may be advantageously used for this purpose, and the amount of barium sulphate added determines the shade of the resultant pigment, the greater amount of sulphate, the lighter the shade. Ordinarily I employ about 100 parts by weight of barium sulphate to one part of barium sulphide, but this proportion may be varied to suit the requirements of the particular pigment desired. The result is a precipitated pigment of fixed color, which may be readily separated from the solution. I have succeeded in producing yellow and red pigments of high quality and the shades of these pigments may be varied by varying the proportion of barium sulphide to barium sulphate, as has been heretofore set forth.

I claim:

1. The method of making pigment which comprises mixing together barium sulphide and uranium acetate in the presence of water.

2. The method of making pigment which comprises bringing together in aqueous solution a mixture of barium sulphide and uranium acetate, in the presence of finely divided barium sulphate, the amount of sulphide being not more than twenty per cent (20%) of the amount of the sulphate, whereby the pigment is precipitated.

3. The method of making pigment which comprises bringing together in aqueous solution barium sulphide and uranium acetate the color of the pigment being determined by the percentage of the barium sulphide to the uranium acetate.

4. The method of making pigment which comprises bringing together in aqueous solution, barium sulphide and uranium acetate, and mixing the resultant product with finely divided barium sulphate, the shade of the pigment being determined by the amount of sulphate added.

5. The method of making pigment which comprises bringing together in aqueous solution barium sulphide, barium sulphate and uranium acetate.

6. The method of making pigment which comprises bringing together barium sulphide and uranium acetate in an aqueous solution in the presence of a finely divided barium sulphate capable of absorbing the material resulting from the reaction and onto which the material resulting from the reaction is adsorbed and with which it is physically united.

In testimony whereof, I have hereunto set my hand.

CHARLES DICKENS.